United States Patent [19]

Anderson et al.

[11] 4,172,619

[45] Oct. 30, 1979

[54] FOLLOW-UP HAND CONTROL VALVE FOR USE WITH HYDRAULIC SPRING BRAKES

[75] Inventors: John K. Anderson, Barrow Haven; Peter Lewyckyj, Lincoln, both of England

[73] Assignee: Clayton Dewandre Company Limited, Lincoln, England

[21] Appl. No.: 886,681

[22] Filed: Mar. 15, 1978

[30] Foreign Application Priority Data

Mar. 21, 1977 [GB] United Kingdom ............... 11759/77

[51] Int. Cl.² .............................................. B60T 15/06
[52] U.S. Cl. .................................. 303/54; 137/116.3; 137/627.5
[58] Field of Search .................. 303/6 C, 7, 9, 54, 71; 137/116.3, 627.5

[56] References Cited

U.S. PATENT DOCUMENTS

| | | | |
|---|---|---|---|
| 1,727,943 | 9/1929 | Sawtelle | 303/54 |
| 2,243,781 | 5/1941 | Thornhill | 303/54 X |
| 2,698,205 | 12/1954 | Gagen | 303/54 |
| 3,463,558 | 8/1969 | Nichols | 303/54 |
| 3,739,802 | 6/1973 | Page et al. | 303/54 |

*Primary Examiner*—Duane A. Reger
*Attorney, Agent, or Firm*—Norris & Bateman

[57] ABSTRACT

A pressure control valve for controlling the operation of spring-actuated fluid pressure released brake units in vehicle braking systems. The valve described requires less operating effort than for conventional control valves of this kind even those including a follow-up means. It has a plunger-type valve element slidable within the carrier and controlling the flow of fluid between inlet and delivery ports. The carrier is biassed towards an open position of the valve in opposition to a spring force by the delivery pressure and the valve element is responsive to delivery pressure to open the valve in opposition to another spring force. The carrier spring has a substantially greater rate than the valve element spring which can be adjusted so that the effort required to operate the valve can be kept to moderate limits while retaining the advantage of a follow-up valve action.

8 Claims, 1 Drawing Figure

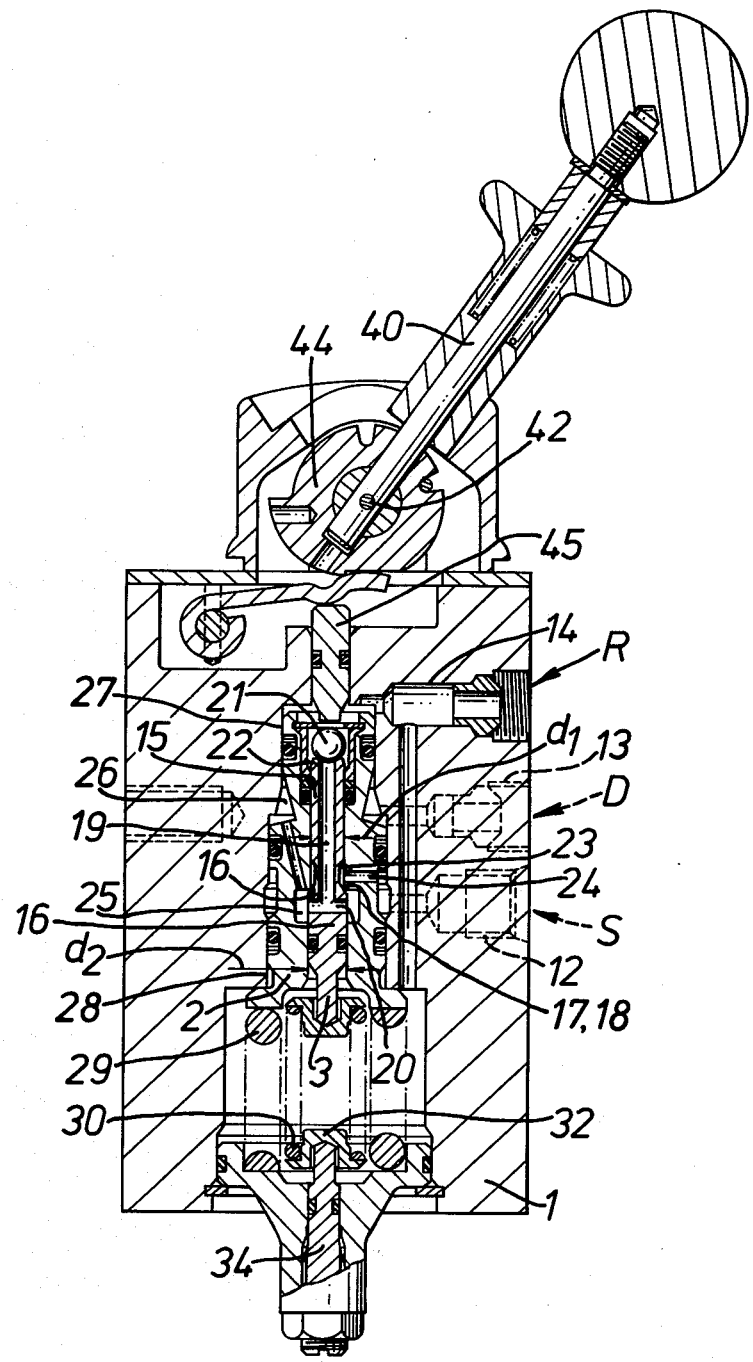

FOLLOW-UP HAND CONTROL VALVE FOR USE WITH HYDRAULIC SPRING BRAKES

This invention relates to pressure control valves as used, for example, for controlling the operation of spring-actuated, fluid-pressure released brake units in vehicle braking systems. Pressure control valves for such purposes need to incorporate positional input, that is, the delivery pressure must be proportional to some geometrical variable such as the angle of the control lever by which the valve is actuated. A simple method of securing such positional input is by interposing a spring between the control level and a reaction piston responsive to delivery pressure, but this arrangement necessitates establishing a relatively large reaction force to achieve reasonable linearity so requiring a correspondingly heavy operating effort. The disadvantage of such an arrangement can be overcome by incorporating follow-up means in which the valve element is movable relative to a valve seat which itself is movable by a reaction piston in the direction to close on to the valve element, the piston being loaded by a graduating spring, but even when using such follow-up means a quite substantial force is required to actuate the valve, particularly at high pressures.

An object of the present invention is to provide a pressure control valve which is economical to produce and which can be actuated by a relatively small effort.

According to the invention we propose a plunger-type valve element which is slidable in a bore in a guide or carrier and has a valve member cooperating with a seating on the carrier to control the flow of fluid between an inlet port and a delivery port, the carrier being biased towards a position to open the valve and displaceable in opposition to the biasing force to close the valve, by delivery pressure acting thereon, wherein the valve element includes an area which is responsive to delivery pressure so as to urge the valve element toward an open position of the valve in opposition to a biasing force tending to close the valve element on to the seating.

Preferably, the valve member is intermediate portions of the element of different diameters, defining therebetween the area subject to the delivery pressure. In the preferred embodiment, the carrier and the valve element are both biased by a spring, the carrier spring having a substantially greater rate than the valve element spring. Thus by adjustment of the tension of the spring loading the valve element, the effort required to operate the valve can be kept to moderate limits while retaining the advantage of a follow-up valve action.

The drawing FIGURE shows a sectional view of the pressure control valve of the invention.

In carrrying the invention into effect according to one embodiment a cross-section of which is shown in the accompanying drawing, the pressure control valve comprises a body or housing 1 formed with a through vertical bore 11 and with spaced transverse passages 12, 13 and 14 respectively, connecting the bore to a supply (accumulator) port S, delivery (brakes) port D, and a return (reservoir) port R. Having a sealed sliding fit in said bore is a tubular guide or carrier 2 within which is disposed a plunger-type valve element 3 also having a sealed sliding fit therein. The valve element includes an upper portion 15 of lesser diameter than the lower portion 16, the two portions being interconnected by a tapered section 17 constituting a conical valve member which co-acts with an annular seating 18 on the carrier. The upper portion of the valve element has an axial passage 19 therein communicating at its lower end with a transverse passage 20 formed in the lower portion 16 of the valve element immediately below the conical valve member 17, a ball valve 21 co-operating with an exhaust seating 22 on the upper end of the valve element to control fluid flow through the axial passage 19, and the bore of the carrier 2 being open at this end and communicating with the return port R. Immediately above the conical valve 17 member, the plunger 3 is formed with a small external groove 23, or annulus which communicates via drillings 24 in the carrier and in the valve body with the supply port. The transverse passage 20 in the valve plunger element 2 opens into an annular chamber 25 formed in the carrier 2 and communicating via a further passage therein with an annular space 26 external of the carrier and connected to the delivery port D. The carrier 2 has an upper section 27 of smaller external diameter than the lower section 28, the annular space 26 being located at the point of transition of the two sections, such that when fluid under pressure is delivered to the space it acts on the carrier 2 to urge it downwards against the action of a main graduating spring 29. A spring 30 also acts on the valve plunger 3, to urge it upwards, the latter spring being seated on a thrust pad 32 which can be adjusted by a screw or bolt 34 to vary the thrust of said spring.

Supported on the upper end of the housing is an operating or control lever 40 angularly displaceable about a horizontal axis 42 and adapted through a rotary cam 44, and if desired a finger or cam follower, to displace downwards a valve-actuating tappet 45 aligned with the upper end of the valve plunger.

Assuming that the pressure control valve is to control operation of the spring brakes of a vehicle the valve operates as follows:

When the spring brake is in the PARK or vented condition the valve plunger 3 and the carrier 2 are located in their uppermost positions in the valve body 1 under the action of their loading springs 29 and 30 with the conical valve 17 engaging its seating to seal off the annulus 43 and with the valve-actuating tappet 45 out of contact with the ball valve 21 so that the brakes are vented via the exhaust passage in the valve plunger and the return port R. Movement of the control lever 40 from the PARK position displaces the tappet 45 downwards, first engaging the ball valve 21 on to the exhaust seating 22 and so disconnecting the delivery port D from the return port R. Further movement of the lever 40 then displaces the valve plunger 3 downwards, moving the conical valve 17 from its seating 18 and so connecting the delivery port D to the supply port S via the drillings 24 in the carrier 2 and body 1 and the annulus 23 on the valve plunger. The delivery pressure acts on the annular area of the carrier 2, determined by the difference between the two diameters thereof, thereby moving the carrier downwards until the conical valve 17 seats again, the downward movement stopping at the point at which the ball valve 21 would begin to open the exhaust passage and so reduce the delivery pressure. In this manner the rate of the spring 29 loading the carrier 2 and the annular reaction area thereof determine the positive relationship between the movement of the tappet 45 and the delivery pressure. The cam 44 actuated by the control lever 40 is shaped to provide a suitable constant or variable ratio between the movements of the control lever 40 and the tappet 45. When the conical valve is moved off its seating the supply pressure conducted to the annulus 23 will be throttled down, producing a delivery pressure which, acting on an area corresponding to the difference between the lower seal area, that is the cross sectional area of the lower portion of the valve element 3, and the mean area of the valve seat, exerts a downward thrust on the valve plunger so that it is overbalanced towards the open position, the downward thrust being counter-balanced by the spring 30 loading the plunger. If the rate of spring 30 to that of spring 29 is in the same proportion as the annular reaction area of plunger 3 is to carrier 2, then the operating load will be zero. The rate of spring 30 is therefore chosen at a higher value than this to give the required operating load. Thus the spring force on the valve plunger 3 is always proportional to the delivered pressure disregarding the small initial load which can be adjusted by the screw or bolt 34 previously mentioned to give only a minimal increase of operating force.

What we claim is:

1. A pressure control valve having a plunger-type valve element which is slidable in a bore in a movably mounted guide or carrier and has a valve member co-operating with a seating on the carrier to control the flow of fluid between an inlet port and a delivery port, the carrier being biased towards a position to open the valve and displaceable in opposition to the biasing force to close the valve, by delivery pressure acting thereon, wherein the valve element includes an area which is responsive to delivery pressure so as to urge the valve element toward an open position of the valve in opposition to an independent biasing force tending to close the valve element on the seating.

2. A pressure control valve according to claim 1 wherein the valve member is intermediate portions of the element of different diameters defining therebetween the area subject to the delivery pressure.

3. A pressure control valve according to claim 1 wherein the carrier and the valve element are each biased by a spring, the carrier spring having a substantially greater rate than the valve element spring.

4. A pressure controlled valve according to claim 1 and comprising means for adjusting the biasing force tending to close the valve element on to the seating.

5. A pressure control valve having a plunger-type valve element which is slidable in a bore in a slidably mounted guide or carrier and has intermediate portions of the element of different diameters, a conical valve member co-operating with a seating on the carrier to control the flow of fluid between an inlet port and a delivery port, the carrier being displaced towards a position to close the valve by delivery pressure acting thereon against the force of a graduating spring, wherein the valve element includes an area defined between the said different diameters, which is responsive to delivery pressure urging the valve element to the open position in opposition to a separate spring tending to close the valve element on to the seating.

6. A pressure control valve comprising a body provided with a bore and transverse ports for connecting said bore respectively to fluid pressure supply, delivery and return lines for a brake system, a carrier slideable in said bore, a plunger-type valve element slidable in said carrier, cooperative seating formations on said carrier and valve element defining an internal valve, means biasing said carrier in a direction to separate said internal valve seating formations, means for independently biasing said valve element in the same direction, coacting passage means in said carrier and valve element operatively associated with said internal valve and said bore, said biasing means acting in a brake inactive condition to engage said internal valve seating formations to close said internal valve and dispose said passage means to provide communication between said delivery and return ports, control means selectively operable to displace said valve element relative to said carrier to separate said seating formations and dispose said passage means to provide communication between said supply and delivery ports, means whereby the delivery fluid pressure is effective to displace said carrier against the force of its biasing means and toward seating of said internal valve formation, and means whereby the delivery pressure is effective at the same time to independently displace said valve element against the force of its biasing means and toward separation of said internal valve seating formations.

7. The pressure control valve defined in claim 6, wherein said carrier and valve element are biased by separate springs, and the rate of the spring biasing the carrier is higher than that of the spring biasing the valve element.

8. The pressure control valve defined in claim 7, wherein means is provided for adjusting the force of the spring biasing said valve element.